United States Patent [19]

Martin et al.

[11] Patent Number: 5,256,465
[45] Date of Patent: Oct. 26, 1993

[54] TENSION FLOOR COVERING HAVING ENHANCED EMBOSSING AND DURABILITY

[75] Inventors: Pamela H. Martin, Lititz; William J. Kauffman, Manheim; Bruce F. Dietrich, Lancaster, all of Pa.

[73] Assignee: Armstrong World Industries, Inc., Lancaster, Pa.

[21] Appl. No.: 500,552

[22] Filed: Mar. 28, 1990

[51] Int. Cl.⁵ .......................... B29D 9/00; B32B 3/26; B32B 27/08

[52] U.S. Cl. ................................. 428/158; 264/45.1; 264/52; 428/159; 428/172; 428/316.6; 428/319.3

[58] Field of Search ............ 428/158, 159, 172, 316.6, 428/319.3; 264/45.1, 52

[56] References Cited

U.S. PATENT DOCUMENTS

| | | | |
|---|---|---|---|
| 3,293,108 | 12/1966 | Nairn et al. | 428/159 |
| 3,399,106 | 8/1968 | Palmer et al. | 428/159 |
| 3,464,178 | 9/1969 | Deichert et al. | 156/71 |
| 3,870,591 | 3/1975 | Witman | 428/316.6 |
| 3,978,258 | 8/1976 | Faust et al. | 428/159 |
| 3,990,929 | 11/1976 | Evans | 156/71 |
| 4,135,675 | 1/1979 | Greiner, Jr. et al. | 242/67.1 R |
| 4,138,521 | 2/1979 | Brown | 428/159 |
| 4,159,219 | 6/1979 | Evans | 156/71 |
| 4,172,169 | 10/1979 | Mawson et al. | 428/159 |
| 4,699,820 | 10/1987 | Herr, Jr. et al. | 428/142 |
| 4,863,782 | 9/1989 | Wang et al. | 428/204 |
| 5,082,708 | 1/1992 | Kauffman et al. | 428/47 |

Primary Examiner—George F. Lesmes
Assistant Examiner—Christopher Brown

[57] ABSTRACT

Improved durability and sharper chemical embossing images are obtained in a thick foamed thermoplastic floor structure by the use of an unfoamed inner layer. The floor covering is formed on a release paper and includes an unfoamed thermoplastic base coat, lower foamed thermoplastic layer, an unfoamed thermoplastic inner layer, an upper foamed thermoplastic layer and a clear coat. The enhanced chemical embossing is achieved by printing an inhibitor containing ink on the inner layer and below the upper foamed layer. Multi-level embossing is obtained by embossing both foamed thermoplastic layers or applying a growth-controlling agent to both surfaces of one foamable thermoplastic layer. The preferred embodiment includes a pearl platelet containing layer above the upper foamed layer to give the illusion of deeper embossing. The preferred embodiment also includes a wear coat of the reaction product of an aminoplast, a urethane and a polyol.

7 Claims, 2 Drawing Sheets

TENSION FLOOR COVERING HAVING ENHANCED EMBOSSING AND DURABILITY

FIELD OF THE INVENTION

The invention relates to resilient tension floor coverings. In particular, the invention is directed to tension floor coverings having enhanced embossing and durability.

BACKGROUND OF THE INVENTION

Buildings are constructed primarily on concrete slabs which are dimensionally stable or on suspended wooden subfloors, including particleboard and plywood. Although the suspended wooden subfloors are less expensive than concrete flooring, the suspended wooden subfloor is less stable than concrete when subjected to humid summer/dry winter seasonal changes. Self-induced tension floor coverings have been developed for these less stable subfloors.

Deichert et al. U.S. Pat. No. 3,464,178, which is incorporated by reference, teaches a method of installing resilient sheet flooring having a porous backing and a thermoplastic resin layer which shrinks in both the machine direction and across machine direction by bonding the backing layer of the sheet flooring to the perimeter of the room.

Evans U.S. Pat. No. 3,990,929, which is incorporated by reference, teaches methods of manufacturing and installing self-induced tension flooring or surface covering by manufacturing the structure on a thermally dimensionally stable backing which is removed just prior to installation at the job site. The surface covering is secured at its perimeter only before the stresses therein are relieved Evans U.S. Pat. No. 4,159,219 teaches a method to produce an unbacked tension flooring by the specific design of two or more thermoplastic layers constructed such that when rolled, the outward facing layer elongates and the inward facing layer is compressed. Upon unrolling and placing flat, the elongated layer overcomes the compressed layer and thus a length greater than the original length before roll-up is generated. This elongation is defined herein as "roll-up growth". On securing the surface covering only at its periphery shortly after unrolling, the tendency of the surface covering to return to its original dimension, i.e., its elastic memory, creates a self-induced tension therein.

Greiner, Jr. et al. U.S. Pat. No. 4,135,675 shows a paper carrier stripping method and stripping apparatus which prevents uncontrolled tension from the necessary procedure of removing a strippable carrier from the structure before placing into a roll upon a windup stand.

Installation of these elongated tension floors by attachment at their periphery has produced one of the most reliable installation methods to accommodate fluctuating dimensional changes of unstable wood subfloors in today's environment.

The prior art tension floors have included a thermoplastic base, a foamed thermoplastic layer and a wear layer. Interest has been expressed in a high-end, rotogravure, tension floor covering. Such a high-end product would have a thicker gauge such as 0.090 inches. Such a tension floor covering could be produced by merely increasing the thickness of the foam layer. However, it is also desired to improve the durability of the floor covering to justify the designation as a high-end product. Further, as the thickness of the foam layer is increased beyond about 25 to 30 mils, the chemically embossed images become less sharp. This is most likely due to the foam growth-controlling agent, such as inhibitor, accelerator or blowing agent, diffusing excessively in the foamable layer prior to foaming.

It is also desired to produce a rich appearance by using a platelet containing layer in the optical surface of the floor covering. The optical surface is defined to be the region of the floor covering which is visible. This region extends from the exposed surface into the floor covering and includes the transparent or translucent wear layer, if any, and at least a portion of the platelet containing transparent or translucent layer.

Such surface coverings are disclosed in copending commonly owned, U.S. application Ser. No. 344,708 now U.S. Pat. NO 5,223,322, which is incorporated by reference, and Wang et al. U.S. Pat. No. 4,863,782.

Various patents such as Mawson et al. U.S. Pat. No. 4,172,169; Brown U.S. Pat. No. 4,138,521; and Faust et al. U.S. Pat. No. 3,978,258 disclose floor coverings in which two foam layers are separated by a decorative coat of solid plastic or a non-woven tissue containing vinyl substrate. However, there is no suggestion of using such structures in a tension floor. As described in Witman U.S. Pat. No. 3,870,591, which discloses a non-foamed poly(vinylchloride) layer containing a cross-linked polymer between two foamed poly(vinylchloride) layers, such layers are included to improve dimensional stability which is the antithesis of the properties desired in a tension floor.

Nairn et al. U.S. Pat. No. 3,293,108, Palmer et al. U.S. Pat. No. 3,399,106 and Wang et al. U.S. Pat. No. 4,863,782 provide good summaries of chemical embossing techniques. While Nairn et al. discloses applying an inhibitor to the supporting base or underside of the resinous layer, none discloses or suggests applying the foam growth-controlling agent to the lower surface of the upper of two foamed layers or applying the foam growth-controlling agent to both foam layers of a dual foam layer structure.

SUMMARY OF THE INVENTION

A principal object of the invention is to provide a resilient tension floor covering having a substantially thick gauge foam layer with improved durability. Another object is to provide a resilient tension floor covering having a substantial portion of its thickness be the result of a foamed thermoplastic but having a more sharply defined chemically embossed image.

A further object is to provide a high-end, rotogravure-tension floor covering with a rich visual appearance which is the result of using a platelet containing layer.

A still further object is to provide a method of enhancing the illusion of embossing depth in a floor covering including a platelet containing layer.

In one embodiment, the invention provides a resilient tension floor covering having an unfoamed plastic inner layer disposed between two foamed thermoplastic layers. The floor covering may include a wear layer disposed above the thermoplastic layers and a platelet containing layer disposed between the wear layer and the thermoplastic layers.

Sharpness of the chemically embossed images is improved by applying the foam growth-controlling agent to the surface interface between the upper foamable layer and the unfoamed plastic inner layer and/or applying a foam growth-controlling agent to both foamable layers of a dual foam layer structure.

In another embodiment, a resilient floor covering including a foamed thermoplastic layer and a platelet containing layer is chemically embossed by applying a foam growth-controlling agent to the surface of the foamed thermoplastic layer opposite the platelet containing layer prior to the foamed thermoplastic layer being foamed.

DETAILED DESCRIPTION OF THE INVENTION

The present invention provides a resilient tension floor covering having improved chemically embossed imaging and durability. The materials and process steps used to form the floor covering are well known in the art. However, those skilled in the art have not used the combination of materials and process steps in the order of the present invention.

The word resilient connotes the ability to recover from deformation, that is recover from indentation that may be created by the heel of a shoe, table leg or wheel. This separates resilient floors from other products used for flooring such as carpeting, wood, ceramics and stone.

Tension floors are floor coverings installed by anchoring at the periphery only such as by adhesive or staples and which tend to shrink thereby remaining taut and flat throughout the fluctuating environment. Wooden subfloors made of plywood can shrink and expand 0.15% due to seasonal changes caused by hot/-humid summers and cold/dry winters. Subfloors made of particleboard can shrink and expand 0.30%. Therefore, a tension floor should preferably accommodate at least 0.1%, more preferably at least 0.15%, and most preferably at least 0.3%, of subfloor movement.

"Structural stability" is a measure of the ability of a floor covering to accommodate such subfloor movement. It is the change in length in percent of a flooring sample which has been heated at 180° F. for six hours and reconditioned at 73.4° F. and 50% relative humidity for one hour. A higher structural stability value indicates the structure is less stable and therefore more susceptible to dimensional change.

To be able to function as a tension floor over all types of subfloors including particleboard, the floor covering must have a structural stability of greater than 0.3%. Loose-lay floors have a structural stability of less than 0.3% since a 0.3% shrinkage would result in about ⅛" gap around the periphery of a 40'×40' room having a loose-lay floor with a 0.3% structural stability installed.

The resilient tension floor covering of the present invention is characterized by a solid or unfoamed plastic inner layer. The improved properties of the present invention are due to this plastic inner layer. However, it is not obvious to include such an inner layer in a tension floor since inner layers including glass mats and dimensionally stable plastic layers typically are used in looselay, non-adhered, flooring to impart dimensional stability.

Figure 1:
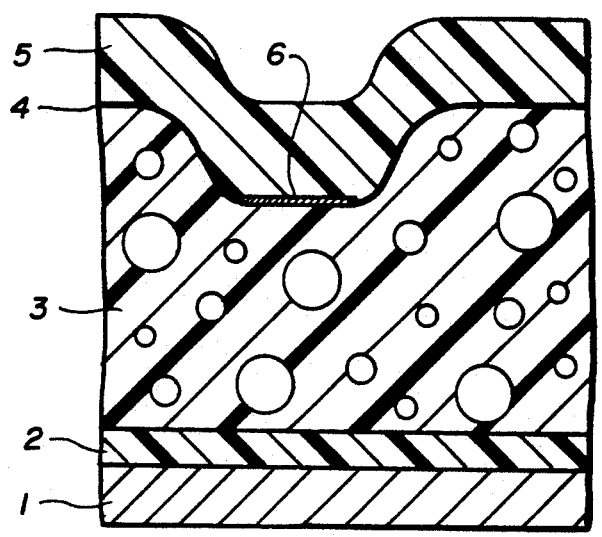
FIG. 1 is a cross-sectional view of a prior art resilient tension floor covering.

The present invention is a resilient tension floor covering. As shown in FIG. 1, the resilient tension floor coverings of the prior art include a strippable supporting material or carrier 1 which may be paper, woven or non-woven fabric, or other media with a release coating such as a stearate-chromic chloride complex, silicone, polyethylene or polypropylene The base layer 2 is an unfoamed thermoplastic layer. Typically, the base coat is approximately 6 mils of a solid, fused, unfoamed vinyl composition such as a plastisol.

The foam layer 3 is a thermoplastic; typically a plastisol containing a blowing agent such as azobisformamide. The foamable plastisol is applied to the base coat and then gelled. After the rotogravure printed pattern 4 and wear layer 5 are applied, the foam layer is blown, typically to about a 3 to 1 ratio. An inhibitor containing ink 6 is printed before, after, or as part of the printed pattern 4.

The foam layer 3 may be less than 20 mils to greater than 70 mils in thickness. However, thick foam structures do not produce sharp chemical embossing details when the blowing agent inhibitor containing ink 6 is printed on the upper surface of the foam layer 3.

Many theories involving inhibitor migration processing conditions have been advanced. However, although migration of inhibitor is important on the processing time window, the major reason for a loss of embossing detail in thick foam structures is physical in nature. The loss of detail is due to the relatively large thickness of low modulus plastic between the relatively stiff base and wear layers.

Figure 2:
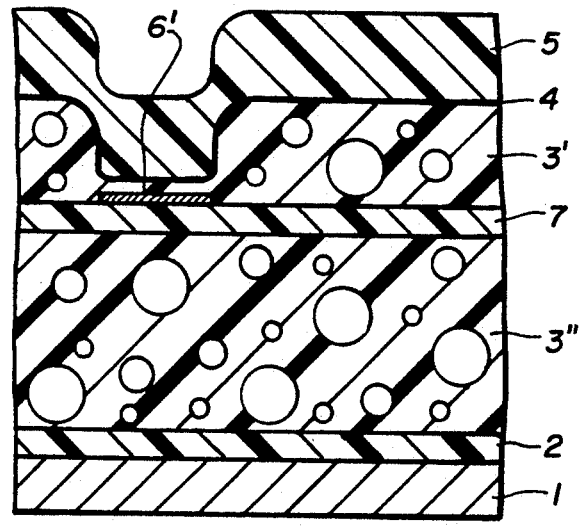
FIG. 2 is a cross-sectional view of the resilient tension floor covering of the present invention.

By modifying the prior art structure as shown in FIG. 2, the overall foam thickness is retained. The unfoamed lowered gel layer which when blown becomes layer 3" is typically about 0.020" in thickness before being blown. The upper gel layer is typically about 0.010" in thickness before being blown. The inner layer 7 is about 0.005" in thickness. The clear coat 5 is typically about 0.015" in thickness. However, the invention is not limited to these specific dimensions.

The chemical embossing occurs in the thin upper foam layer 3'. The composition of the various layers is the same as the prior art structure. In fact, the solid, unfoamed inner layer 7 may be of the same composition as the base layer 2 or clear coat 5.

A deeper, more well defined embossing image is achieved if the inhibitor containing ink 6' is printed below the foamable gel rather than on top of the gel. The solid plastisol inner layer 7 acts as a barrier to inhibitor migration. Therefore, the lower foam layer 3" is substantially uniformly expanded.

Based on profilometer and visual studies, it has been determined that the deeper the embossing, the better the visual rating. Also, the thinner the wear layer, the better the embossing rating and the thicker the inner layer, the better the embossing rating.

The unfoamed inner layer is preferably a thermoplastic, and most preferably a vinyl. However, it may be a slightly crosslinked vinyl, urethane or other polymer system, as long as it is sufficiently elastic to accommodate the subfloor movement. The unfoamed inner layer also improves durability as measured by breaking strength, can drop, gouge, pendulum gouge and brown tear tests.

Figure 3:
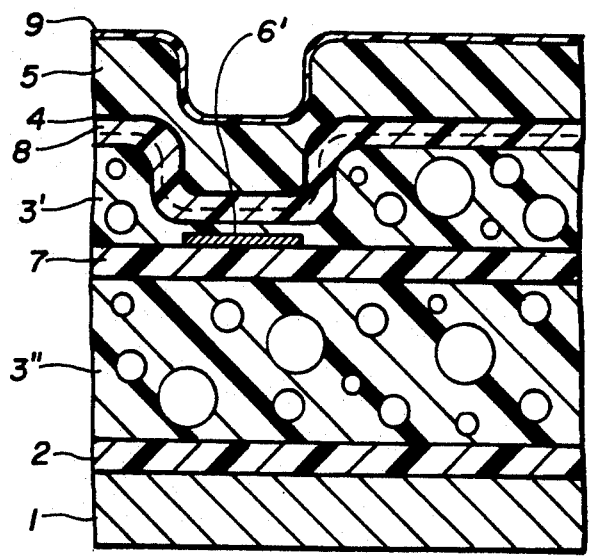
FIG. 3 is a cross-sectional view of a second embodiment of the resilient tension floor covering of the present invention.

In one preferred embodiment shown in FIG. 3, a pearl pigment containing layer 8 is applied to the upper foam layer 3' before the rotogravure printed pattern 4 is applied. The preferred application method is with a blade-over-roll coater. The pearl platelets are typically 5 to 16 microns in length and the thickness of the layers typically 3 to 10 mils, but is not restricted to this range.

The pearl platelets at the surface of this layer are oriented as a result of the coating technique employed. The layer is then gelled at about 270° F., preferably around a heated drum. When the foam layer is expanded, the pearl plastisol layer is deformed reorienting the pearl platelets and creating the appearance of embossing depth greater than what is actually there.

Also, a wear layer 9 such as described in Bolgiano et al. U.S. Pat. No. 4,781,987 overlies the decorative ink 4 and clear coat 5. This composition is the reaction product of an aminoplast, a urethane and a polyol. The thickness is nominally 0.0005".

Figure 4:
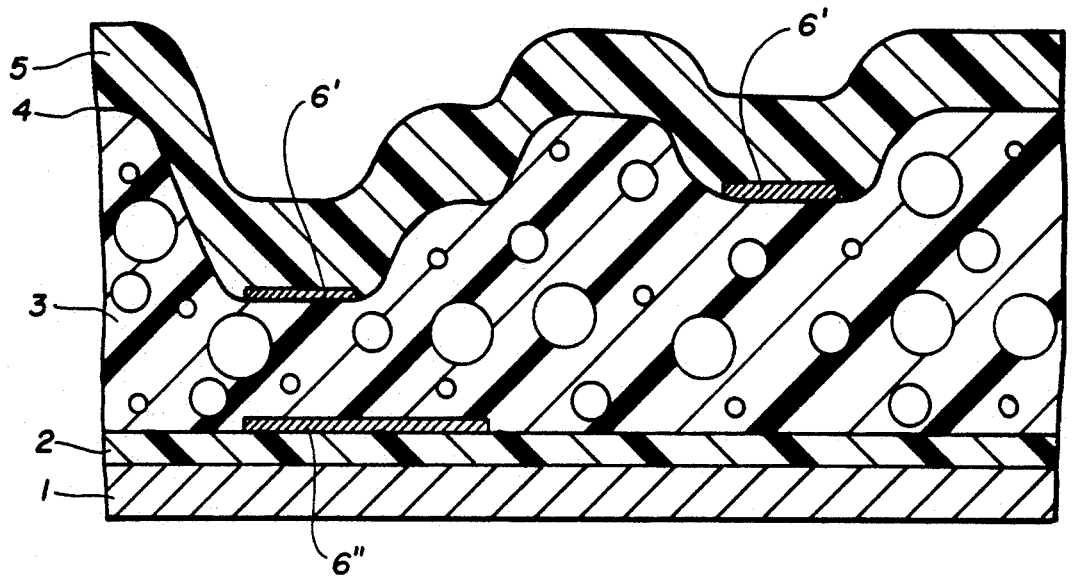
FIG. 4 is a cross-sectional view of a third embodiment of the resilient tension floor covering of the present invention.

As shown in FIG. 4, multilevel embossing detail can be achieved and controlled by chemically embossing of both top and bottom foam layers. The prior art has not been able to achieve this effect in commercial single-foam component structures because of aging and migration effects of the chemical embossing inhibitor.

The structure of the FIG. 4 embodiment is the same as the FIG. 2 embodiment except an inhibitor containing ink 6" has been printed on the base layer 2 in register with the inhibitor containing ink 6'. As noted with reference to FIG. 4, the multilevel effect may be obtained either by offsetting the inks 6' and 6", or printing the inks 6' and 6" in alignment but in patterns of different widths, or a combination of both. Obviously, if the sharper imaging resulting from printing below the foamable layer is not critical, the inhibitor containing inks can be printed above the foamable layers, or one above and one below each foamable layer.

Figure 5:
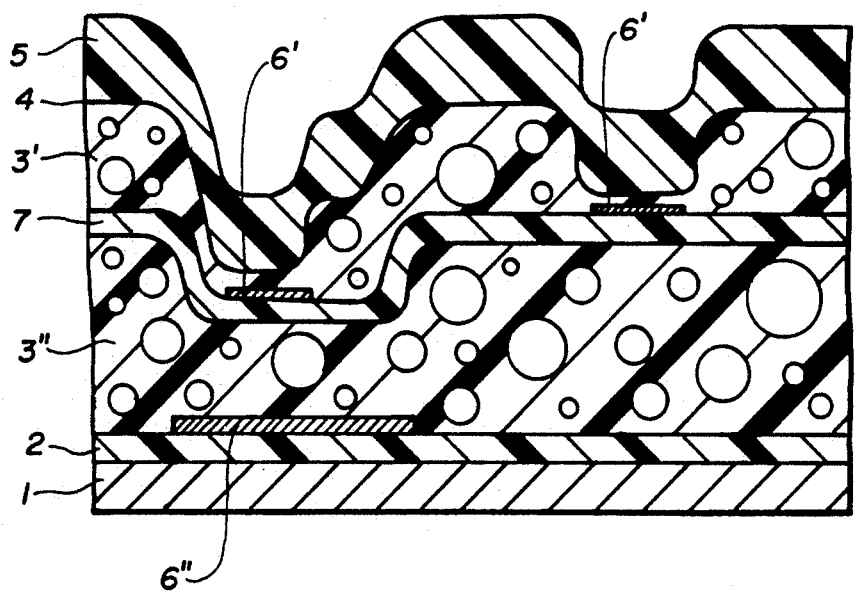
FIG. 5 is a cross-sectional view of a fourth embodiment of the resilient tension floor covering of the present invention.

The aging and migration effects noted above hindered the prior art attempts to form multilevel chemical embossing by printing inks carrying different amounts of inhibitor on the same surface of the foamable layer. This disadvantage can be mitigated by printing an inhibitor containing ink on both surfaces of a foamable layer as shown in FIG. 5. The structure of the FIG. 5 embodiment is the same as the prior art structure of FIG. 1 except an inhibitor containing ink 6" has been printed on the base layer 2.

EXAMPLE 1

Two samples, Examples 1A and 1B, were made. Two release papers were coated with 5 mils of PVC plastisol composition 1 to form a base coat.

| Component | Wt. % |
|---|---|
| Composition 1 | |
| Texanol isobutryrate plasticizer | 10 |
| Dihexylphthlate plasticizer | 17 |
| Blending type PVC resin | 27 |
| Dispersion grade PVC resin | 45 |
| Barium/zinc phosphate stabilizer | 1 |

The samples were then coated with 20 mils of a foamable plastisol composition 2 and gelled.

| Component | Wt. % |
|---|---|
| Composition 2 | |
| Limestone filler | 18 |
| Titanium dioxide filler | 4 |
| Dioctylphthlate plasticizer | 19 |
| Epoxy soya oil plasticizer | 1 |
| PVC Blending resin | 18 |
| PVC Dispersion resin | 31 |
| Paraffin mineral spirit diluent | 3 |
| Recycled plastisol | 2 |
| Foam paste (composition #3) | 4 |
| Composition 3 | |
| Azodicarbonamide blowing agent | 18 |
| Barium Neodecanoate stabilizer | 7 |
| Titanium dioxide pigment | 44 |
| Zinc oxide initiator/catalyst | 6 |
| Dioctylphthlate plasticizer | 25 |

A 5 mil plastisol inner layer of composition 1 was then applied to each sample followed by another 8 mils of the foamable plastisol composition 2. 15 mils of a clear PVC composition 4 was applied and the foamable gel expanded to a ratio of about 3 to 1

| Component | Wt. % |
|---|---|
| Composition 4 | |
| PVC Blending resin | 4 |
| PVC Dispersion resin | 61 |
| Texanol isobutryrate plasticizer | 12 |
| Butylbenzylphthlate plasticizer | 15 |
| 2,4,7,9 tetramethyl-5-decyne-4,7-diol and ethylhexanol surfactant | 3 |
| Dialkylmaleate ester surfactant | 2 |
| Barium/zinc phosphite stabilizer | 3 |

A control sample was prepared in a similar manner except 30 mils of foamable gel was applied rather than the two layers of 20 mils and 8 mils and the 5 mil unfoamed inner layer.

The samples were subjected to breaking strength, can drop, gouge, pendulum gouge and brown tear tests as follows:

Breaking Strength

The breaking strength was measured in accordance with Federal Test Method Standard 501a, Method 4111 on an Instron tensile tester. The results are reported in pounds per inch width.

Can Drop

This test simulates the type of impact on the wearing surface of resilient floorings which results from the dropping of heavy objects such as filled food and beverage cans. A projectile weighing 13 oz. and having a point of contact similar to the edge of a tin can is mounted with two ball bearing rollers on a vertical projectile guide. The projectile is dropped onto a 4"×6" sample at 10" increments until a failure occurs. Failure is defined as any cracking, cutting or separation that can be seen after close visual examination. A magnifying glass may be used. The projectile is then dropped at 5" increments until three drops at the same height are passes and three drops at the same height are failures. The highest height with three passes is reported.

Gouge

A 16 oz ⅛" diameter rod with a sharp corner is dropped on a 4"×6" sample through a guide tube and impacts the sample which is mounted at a 45° angle. Otherwise the test procedure is similar to the can drop test.

Pendulum Gouge

A weighted pendulum with a ⅜" diameter, rounded foot is dropped on a horizontally supported 40"×6" sample at a 15° angle. The impact force in inch-pounds before rupture of the wear surface is reported.

Brown Tear

A U-shaped specimen, a 2"×4" specimen having a ¼"×1-½" slot with a semicircular closed end, is held by its two legs in the jaws of an Instron and pulled apart. The sample is conditioned at 23° C. and 50% R.H. for 24 hours prior to the test. The load in pounds at initial tearing is reported.

The results of the tests are summarized in Table 1.

TABLE 1

|  | Breaking Strength | Can Drop | Gouge | Pendulum Gouge | Brown Tear | Total Value |
|---|---|---|---|---|---|---|
| Example 1A | 110.0 | 45 | 9.0 | 86 | 44.5 | 294.5 |
| Example 1B | 96.2 | 50 | 8.5 | 81 | 37.9 | 275.0 |
| Comparison | 68.9 | 30 | 5.5 | 54 | 29.3 | 187.7 |

As seen from Table 1, the structures of the present inventions are superior to the prior art in each of the tests. In fact, the overall improvement is approximately 50% better durability.

EXAMPLE 2

A design study was undertaken to optimize the durability characteristics. The 6 mil base coat was held constant and the total product gauge was 100 mils. The design study varied the clear coat thickness between 10 to 20 mils, the top foam thickness between 15 and 30 mils expanded 3:1, the inner layer thickness between 10 to 20 mils and bottom foam thickness between 10 to 20 mils expanded 3:1.

The effect of these variables on impact (can drop), gouge and brown tear was determined using 10 experimental points with two duplications for estimation of experimental error.

A release paper was coated with 6 mils of plastisol base coat. Each layer of the structure was applied at various thicknesses as set forth in Table 2 and gelled at 140° C. After all the layers were applied, each sample is fused at 192° C. to obtain a 3:1 blow ratio.

TABLE 2

| Sample | Bottom Foam (mils) | Inner Layer (mils) | Top Foam (mils) | Barrier Coat (mils) |
|---|---|---|---|---|
| 1 | 14 | 20 | 8 | 10 |
| 2 | 13 | 20 | 5 | 20 |
| 3 | 18 | 16 | 5 | 10 |
| 4 | 14 | 10 | 8 | 20 |
| 5 | 15 | 10 | 10 | 10 |
| 6 | 10 | 20 | 10 | 15 |
| 7 | 14 | 15 | 8 | 15 |
| 8 | 18 | 10 | 5 | 15 |
| 9 | 10 | 15 | 10 | 20 |

TABLE 2-continued

| Sample | Bottom Foam (mils) | Inner Layer (mils) | Top Foam (mils) | Barrier Coat (mils) |
|---|---|---|---|---|
| 10 | 20 | 10 | 5 | 10 |

Based on the testing, it was determined that increasing thickness of all layers increased impact resistance and that the thickness of the top clear coat had the most influence on impact resistance, followed by the inner layer thickness and the top foam layer thickness.

Increasing thickness of the top clear coat and inner layer increased gouge resistance. The top clear coat thickness had the most significant influence on gouge resistance and increasing the top foam thickness had a negative influence on gouge resistance.

The clear coat and inner layer had significant, positive influence on brown tear properties. The influence of the inner layer was somewhat greater than the clear coat. The top foam thickness had a significant, negative influence on brown tear properties.

On the basis of the design study, the best physical performing structure with good chemical embossing details utilizes a 20 mil clear coat and a 20 mil inner layer.

EXAMPLE 3

A fine line image of benzotriazole (BTA) containing ink was printed on a 6 mil plastisol base coated release paper. The sample was coated with 10 mils of foamable plastisol and gelled. A broad line image of BTA ink was also printed on 6 mils of base coated release paper and 10 mils of foamable plastisol was applied and gelled. Control samples were prepared by printing on top of the gelled foam. All the samples were clear coated, expanded and chemically embossed under identical conditions. The samples on which the foamable plastisol was coated over the BTA ink showed deeper chemical embossing profiles compared to the control.

EXAMPLE 4

Ten mils of a foamable plastisol was applied to a release paper and gelled. Then a 10% BTA clear rotogravure ink was printed on the foamable plastisol. A 10 mil unfoamed plastisol barrier coat was applied and gelled, then another 10 mils of foamable plastisol was coated and gelled. The second foamable gel was printed with a 10% BTA pigmented ink in register with the previous print.

A control sample was also prepared only printing the upper surface of the top foamable layer with both BTA inks in register. Both samples were clear coated, expanded and chemically embossed under identical conditions. Example 4 exhibited clearly multilevel chemical embossing profiles whereas the control did not.

We claim:

1. A floor covering comprising a resilient tension floor structure including an upper foamed thermoplastic layer, a lower foamed thermoplastic layer, an unfoamed plastic inner layer disposed between the upper and the lower foamed thermoplastic layers, and a foam growth-controlling agent applied to the interface between the inner layer and the upper foamed thermoplastic layer whereby the upper foamed thermoplastic layer is embossed and the lower foamed thermoplastic layer is not embossed.

2. A resilient floor covering comprising a foamed thermoplastic layer, said foamed thermoplastic layer being chemically embossed by the application of a foam growth-controlling agent to both surfaces of said foamed thermoplastic layer.

3. The floor covering of claim 2, wherein the foam growth-controlling agent is an inhibitor.

4. The floor covering of claim 2 further comprising a second foamed thermoplastic layer and a plastic inner layer, said inner layer being disposed between the first and second foamed thermoplastic layers.

5. A method of enhancing the illusion of embossing depth in a floor covering comprising:
a) laying up a foamable thermoplastic layer,
b) bringing a foam growth-controlling agent in contact with a surface of the foamable thermoplastic layer,
c) disposing a platelet containing layer adjacent the foamable thermoplastic layer with the surface region of the platelet containing layer opposite the foamable thermoplastic layer having the platelets adjacent the surface substantially aligned with the surface, and
d) then foaming the foamable thermoplastic layer.

6. The method of claim 5 further comprising laying up a plastic inner layer on the side of the first foamable thermoplastic layer opposite the platelet containing layer, and laying up a second foamable thermoplastic layer of the side of the inner layer opposite the first foamable thermoplastic layer.

7. The method of claim 5 further comprising applying the foam growth-controlling agent to the surface of the foamable layer opposite the platelet containing layer.

* * * * *